P. BROADBOOKS.
SHEARS AND WIRE CUTTER.
APPLICATION FILED MAR. 28, 1917.

1,262,303.

Patented Apr. 9, 1918.

Inventor
Peter Broadbooks
By Alexander Dowell
Attorneys

UNITED STATES PATENT OFFICE.

PETER BROADBOOKS, OF BATAVIA, NEW YORK.

SHEARS AND WIRE-CUTTER.

1,262,303.　　　　　　Specification of Letters Patent.　　　Patented Apr. 9, 1918.

Application filed March 28, 1917. Serial No. 157,975.

*To all whom it may concern:*

Be it known that I, PETER BROADBOOKS, a citizen of the United States, residing at Batavia, in the county of Genesee and State of New York, have invented certain new and useful Improvements in Shears and Wire-Cutters; and I hereby declare that the following is a full, clear, and exact description thereof, reference being had to the accompanying drawings, which form part of this specification.

This invention is a combined hand shears, or tinners' snips, and wire cutters, in which minimum weight with maximum power are realized.

One object of the invention is to provide such shears with tripods or supports on both sides which will enable the shears when laid down to be more readily picked up. Another object is to provide the shears with means by which wires and the like can be rapidly cut. Another object is to provide one of the hand rings of such shears with a lug which will enable the shears to be used if desired as a bench shears without adding any extra expense to their manufacture.

I will explain the invention as illustrated in the accompanying drawings and set forth in the claim the features and combinations of parts for which protection is desired.

Figure 1:
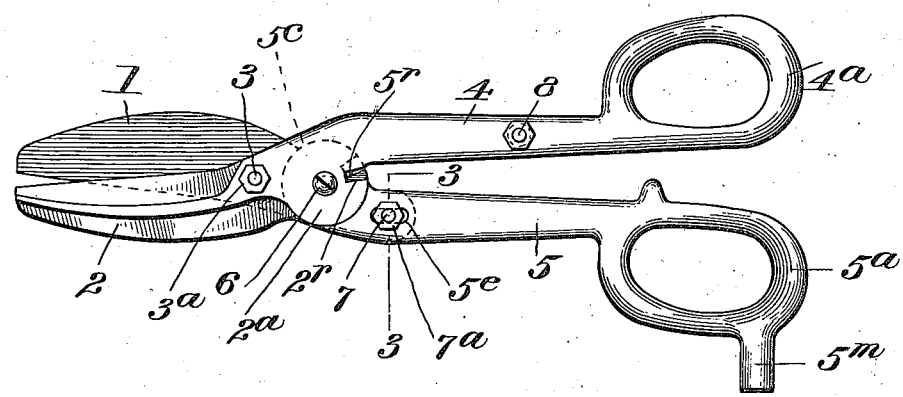
Figure 1 is a plan view of the shears and wire cutters.

The shears comprise a main cutting jaw 1 and a minor cutting jaw 2. The jaw 1 is pivotally connected to jaw 2 by a bolt or rivet 3 which may be secured by a nut $3^a$. Jaw 1 has a shank $1^b$ extending in rear of pivot 3.

The minor jaw 2 is preferably rigidly connected with a main lever 4 which extends in rear of the pivot 3, and forms one of the handle levers of the shears, and is provided at its outer end with the usual hand ring $4^a$. This jaw 2 is provided in rear of the pivot 3, with a circularly recessed complemental pivotal connection or bearing $2^a$ to which is fitted the complementally formed end $5^c$ of a lever 5, pivoted thereto by a pivot bolt 6, and lever 5 is provided on its outer end with a hand ring $5^a$ by which it may be manipulated.

I provide one of the hand rings, preferably ring $5^a$, with an integral lug $5^m$ so that the hand shears may also be converted to a very useful and convenient bench shears.

The jaw 2 and lever 5 lie in the same plane, and the extension or shank $1^b$ of the jaw 1 lies close against lever 5, said shank projecting rearwardly from the pivot 3 and in rear of the pivot 6; and to the end of shank $1^b$ is attached a bolt 7 which extends through a slot $5^e$ in the lever 5 and may be secured by a nut $7^a$ as shown. The construction is such that lever 5 acting on the rearward extension or shank of the jaw 1, exerts a compound leverage upon jaw 1, thereby insuring a powerful shearing action by the jaws.

A standard 8 is attached to the lever 4; and the heads $3^n$, $7^n$ of pivot bolts or pins 3 and 7 project at the same side of the shears as the body of the standard. The standard 8 and the projecting heads $3^n$, $7^n$ of the bolts 3 and 7 form a tripod upon which the shears may be supported, as shown in Fig. 2, so that when the shears are lying upon a flat surface they can be more readily picked up by an operator.

Figure 2:
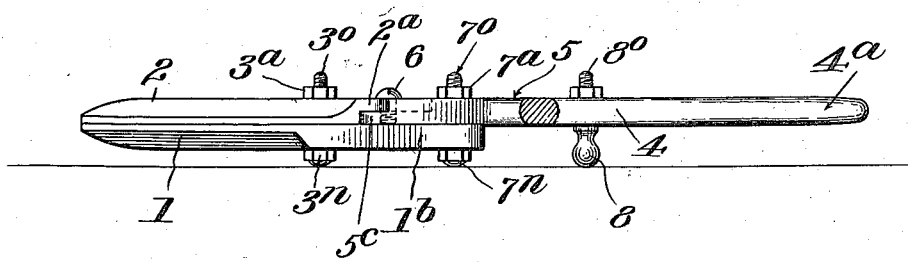
Fig. 2 is an edge view of the same partly broken away.
Figure 3:
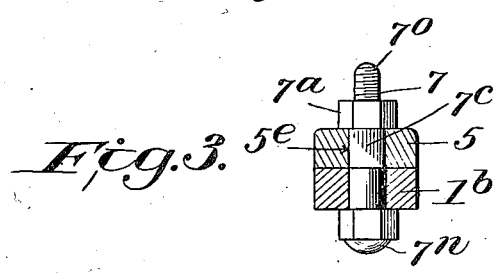
Fig. 3 is an enlarged detail transverse section on line 3—3, Fig. 1.

I have also extended the threaded end of the standard 8 as shown at $8^o$ Fig. 2 and the ends of the bolts 3 and 7, as shown at $3^o$, $7^o$, Fig. 2, so that together they form a tripod at the opposite side of the shears, and will support the same, if laid with the side down, above the surface on which it is placed so that it can be easily grasped by the workman.

The shearing jaw 2 is preferably forged integral with the handle lever 4, and the other handle lever 5 is pivoted to the integral lever and jaw, and also is pivotally connected with the shank of the opposite jaw 1 by the sliding bolt 7, and the two jaws are held in contact by the pivot or fulcrum bolt 3.

In the rear side of the complemental part $2^a$ of jaw 2 is an open notch $2^r$; and in the rear side of the complemental part $5^c$ of lever 5 is a similar notch $5^r$; these notches register when the jaws are opened, and the sides of said notches form cutters for wire, etc.

It will be noted, that in this specifically constructed hand shears, I provide the actuating lever 5 with an oblong perforation or slot $5^e$ required for the short give and take movement of the sliding bolt 7. The shank of this sliding bolt being provided with a squared or flattened portion 7ᶜ engaging the slot 5ᵉ and has greater strength and durability than an ordinary pivot; the flattened shank of this sliding bolt being slidably mounted in the slot of its relative shearing jaw will thus obviate frictional wear.

The hand levers are provided with hand rings as the shears is expressly constructed for hand use, and on account of its small size and light weight is most convenient and practical.

The lug 5ᵐ on ring 5ᵃ is a very convenient addition as it enables the hand shears to be also used like an ordinary bench shears. It is obvious that such lug could be engaged with a plate or a socket on a bench to hold the shears in an upright position.

The wire cutter notches and the tripod supports for the shears are valuable practical improvements in my shears. The open notches 2ʳ, 5ʳ enable wire to be readily engaged therewith, and wires can be cut of any desired length without the necessity of drawing the wire endwise through the notches.

What I claim is:

A shears comprising a pair of jaws; a pivotal bolt connecting said jaws and projecting on both sides of the device to form supporting members; a main lever integrally connected to one of the jaws in rear of the jaw pivot and provided with a hand ring on its outer end; the other jaw having a shank extending in rear of said pivot; an actuating lever for the latter jaw provided with a hand ring and pivotally connected to the main lever in rear of the jaw pivot; a slidable pivotal bolt connecting the said shank to the actuating lever in rear of the pivotal connection of said lever to the main lever, said bolt projecting on both sides of the device to form a second set of supporting members; and a supporting member rigidly connected to the main lever in rear of the slidable bolt and projecting on both sides of the device to form a third set of supporting members.

In testimony that I claim the foregoing as my own, I affix my signature.

PETER BROADBOOKS.